US010928251B2

(12) United States Patent
Park et al.

(10) Patent No.: US 10,928,251 B2
(45) Date of Patent: *Feb. 23, 2021

(54) INTER-INSTRUMENT VARIATION CORRECTION

(71) Applicant: DATACOLOR INC., Lawrenceville, NJ (US)

(72) Inventors: Taeyoung Park, Princeton Junction, NJ (US); Hong Wei, Princeton, NJ (US); Zhiling Xu, West Windsor, NJ (US); Venkata R. Thumu, Pennington, NJ (US)

(73) Assignee: DATACOLOR INC., Lawrenceville, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/673,405

(22) Filed: Nov. 4, 2019

(65) Prior Publication Data

US 2020/0103284 A1    Apr. 2, 2020

Related U.S. Application Data

(63) Continuation of application No. 16/144,280, filed on Sep. 27, 2018, now Pat. No. 10,502,628.

(51) Int. Cl.
 *G01J 3/02* (2006.01)
 *G01J 3/52* (2006.01)
 *G01J 3/46* (2006.01)

(52) U.S. Cl.
 CPC .............. *G01J 3/524* (2013.01); *G01J 3/0272* (2013.01); *G01J 3/465* (2013.01)

(58) Field of Classification Search
 CPC .......... G01J 3/524; G01J 3/465; G01J 3/0272; G01J 3/02; G01N 21/03; G01N 21/31; G01N 33/14; G01N 33/54; G01N 1/30; G01N 1/31
 See application file for complete search history.

(56) References Cited

U.S. PATENT DOCUMENTS

| | | | |
|---|---|---|---|
| 10,502,628 B1 * | 12/2019 | Park | G01J 3/52 |
| 2003/0078794 A1 | 4/2003 | Knapp | |
| 2017/0131147 A1 | 5/2017 | Yu et al. | |

OTHER PUBLICATIONS

International Search Report and Written Opinion in corresponding PCT Application No. PCT/US2019/053389, dated Dec. 10, 2019.

* cited by examiner

*Primary Examiner* — Abdullahi Nur
(74) *Attorney, Agent, or Firm* — Leason Ellis LLP (57) ABSTRACT

Embodiments of the present invention are directed towards systems, methods and computer program products for correcting inter-instrumentation variation among color measurement devices. In one particular implementation, a method for correcting inter-instrument variation among color measurement devices includes obtaining a set of color measurements of an item under analysis. The described approach also includes accessing a conversion model, wherein the conversion module has been generated using one or more ANN back propagated over a collection of data points, where the data points correspond to measurements of a color standard using devices from a control device batch and a test device batch. Using the conversion module, a processor is configured to transform the set of color measurements into a calibrated color measurement set. The calibrated color measurement set is then output to at least one display, memory or remote computing device.

20 Claims, 7 Drawing Sheets

INTER-INSTRUMENT VARIATION CORRECTION

CROSS-REFERENCE TO RELATED APPLICATION

This application is a Continuation of U.S. application Ser. No. 16/144,280, filed on Sep. 27, 2018 which is hereby incorporated by reference in its entirety.

FIELD OF THE INVENTION

The present invention is directed to spectrum measurement devices and approaches for correcting inter-instrument variation among similar spectrum measurement devices.

BACKGROUND OF THE INVENTION

In the color quality control field, industry standard colorimeters are used to measure color for purposes of quality control and communication of color parameters. These colorimeter devices are well understood in the field and produce accurate color measurements. When these devices are produced on a significant scale, it becomes paramount that product-to-product color consistency across the manufactured units is maintained. Specifically, where color or spectrum measurement instruments are used as part of a product quality control procedure, each color or spectrum measurement device used must produce consistent results, not just in a measurement to measurement capacity, but across all measurement devices. For example, it is of vital importance that two different users be able to use two different spectrophotometers of the same make and model, from the same manufacturer, and receive nearly identical color measurements.

There are several well-known methods and techniques for determining if the colors measured by a color measurement device are accurate. However, these methods fail to provide a mechanism for ensuring that each measurement instrument performs similarly to all other measurement instruments having the same production characteristics.

Additionally, there exist in the art various methods used to correct the measurement results among different instruments. However, the traditional correction methods fail to improve the inter-instrument-agreement (IIA) in many cases. Often there is no single reason for the failure of inter-instrument agreement approaches, as the underlying causes are complex and cannot be resolved using traditional approaches.

Furthermore, some color measurement instruments are unable to provide spectrum information. Where such instruments are capable of outputting only color tristimulus values, (e.g. a colorimeter), the traditional and routine techniques for obtaining inter-instrument agreement are unsuitable.

Therefore, what is needed in the art are systems, methods and processes to evaluate and compensate for the difference between the measured outputs of different instruments of the same or similar make and model. Furthermore, what is needed in the art are systems, methods and approaches to allow correcting color tristimulus values that are output by a measurement device so as to insure uniform measurements across different batches of devices produced at different times and/or with different components.

SUMMARY OF THE INVENTION

Embodiments of the present invention are directed towards systems, methods and computer program products for correcting inter-instrument variation among color measurement devices. In one particular implementation, a method for correcting inter-instrument agreement among color measurement devices includes obtaining a set of color measurements from an item under analysis. The described approach also includes accessing a conversion model generated using one or more Artificial Neural Networks (ANNs) trained over a collection of input data obtained from one or more test color measurements devices sharing production parameters in common with the color measurement devices. Using the conversion module, a processor is configured to transform the set of color measurements into a calibrated color measurement set by applying the obtained set of color measurements to the ANN. The calibrated color measurement set is then output to at least one of a display, memory or remote computing device.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF CERTAIN EMBODIMENTS OF THE INVENTION

By way of overview, various embodiments of the systems and methods described herein are directed towards using trained neural networks to correct for variation among and between measurement devices. In a further implementation, the various implementations described are directed to correcting inter-instrument variation for instruments that are the same make and model but produced under different production conditions.

By way of continued explanation, in order to produce consistent results across operations employing multiple color measurement devices, it becomes critical that each unit of the particular make and model of measurement instrument have inter-instrument measurement consistency. For example, two different users may use two different spectrophotometers, colorimeters, or other color or spectrum measurement devices of the same model, from the same manufacturer, to measure the same color sample, and ideally, the results obtained from the two instruments should be nearly identical.

However, it is common that even when units are manufactured using the same components and techniques, small differences still occur in the measurements made by two or more different units of the same make or model if they originate from different production batches. Such variance in outputs is true even when the instruments are produced by the same manufacturer, at the same facility.

To correct for such variances, traditional profile-based corrections are often used. For example, the following equation can be used to compensate for small systematic differences between instruments:

$$Rci = A + B\ Rmi + C\ R'mi + DR''mi + E\ Rmi(100-Rmi) \quad \text{(EQN. 1)}$$

where $Rmi$ is the $i^{th}$ measured reflectance, $Rci$ is the $i^{th}$ corrected reflectance, all $Rci$, $Rmi$, and variables A, B, C, D, and E implicitly depend on wavelength, and ' and " refer to the first and second derivatives, respectively, of $Rmi$ with respect to wavelength. The corrections in EQN. 1 are represented by the following parameters: offset (A), gain change (B), wavelength-scale change (C), bandwidth change (D), and some nonlinearities (E).

Such traditional correlation methods can improve the inter-instrument-agreement (IIA) in many cases. However, where the underlying causes of the instrument variance arise from the complex interactions of the components of the color measurement device, traditional approaches, such as the measurement correction of EQN. 1, fail to improve the variance between similar instruments.

Additionally, such traditional variance correction approaches (such as but not limited to the one provided in EQN. 1) are unsuitable for use on instruments that provide color tristimulus values as an output of the color measurement process. Devices such as colorimeters require an alternative approach to correct for inter-instrument measurement variations.

Generally, in the production of spectrum measurement devices, such as color measurement devices, there is a necessity to ensure that the measurements of a given device match some master or control measurement. For example, when manufacturing devices in batches, it is of paramount importance to have the produced devices accurately measure colors (as evaluated against a known set of reference color measurement values) as well as have high levels of inter-instrument agreement with a control group or batch of devices. That is, it is important that units within multiple different product batches all produce measurements that are both accurate and within a pre-determined level of tolerance relative to the output of a control, master or standard device batch.

By way of non-limiting example, a control batch of measurement devices can be established by obtaining a collection of devices all manufactured at a similar time, using substantially identical components. For instance, the first factory run of color measurement devices produced using substantially identical components can constitute a first or control batch. Here, substantially identical means components all having the same make and model number, provided by the same supplier, and manufactured by the same manufacturer.

Each individual color measurement device produced in the control batch is subject to quality control analysis. For example, each color measurement device is used to measure a collection of known color references. The resulting measurements are compared against a collection of reference values, and when the measurement is within a pre-determined range, the device of this control batch is considered to be a control device. This process can be repeated for each device produced within the control batch, such that at the end of the procedure, each measurement device within the control batch has been determined to have a requisite level of accuracy.

As it often happens in the production of complex, multi-component products, during manufacturing process, components can be changed without intending to change the overall functionality of the device. For example, in a later produced batch of color measurement devices, some components (for a number of potential reasons) are exchanged for non-identical, but substantially equivalent components. For instance, the substantially equivalent components can be a different make and/or model as used in the control batch products but with the same functionality as the control batch components. The control batch measurement devices demonstrate low levels of inter-measurement variation, as well as accuracy when measuring a known color sample. Likewise, this second production batch of measurement devices will also be checked for accuracy and inter-measurement variation among the members of the second production batch. However, when the second production batch members are compared to the control batch average, a higher than acceptable level of inter device variation becomes apparent.

Without being held to any explanation or cause, devices that are of the same make and model, but are produced with functionality identical but different components, hardware, or software, or at a different facility, introduce complex and subtle differences into the operation of the measurements devices such that there is less IIA between batches.

If left uncorrected, when individual units of different batches of color measurement devices are used, these devices will have significant differences in the measured color output values. Thus, in a particular implementation, one or more approaches are used to correct for the divergence found in later production batches relative to the control batch.

In one particular approach described in more detail herein, an artificial neural network is used to correct the measurements made by a later produced batch so that the output measurement values generated by a unit of the later produced batch have a high degree of IIA relative to the units of the control batch. For example, both the devices of the control batch and the devices of the later produced batch are used to measure a collection of color references. Using an artificial neural network, or other machine learning algorithm, a processor is able to generate one or more models, algorithms, coefficients or values that when applied to the measurement output of a color measurement unit of later produced batch, causes the measurement values to be in line or within a pre-determined threshold range of the measurements made using measurement devices of the control batch.

Using the color measurements obtained from both a production batch of measurement devices and a control batch of measurement devices, the artificial neural network (ANN) is utilized to provide a model of the divergence of color measurement values across different units of the same make and model of color measurement device. For example, such an artificial neural network is configured to generate a function or collection of coefficients that when applied to any given member of the later batch of color measurement instruments, will correct the measurements made such that the resulting output of the later batch measurement device is substantially similar to the output that would have been produced by one or the measurements devices of the control batch. In one particular implementation, using such a model, functions or coefficients can be applied to the direct color measurements made by a color measurement device of the later batch, so as to convert the measurements into the color measurements that would have been made by an average or representative device of the control batch.

Such an approach improves the accuracy of each unit of the later produced batch and represents a technical advancement in the field of color measurement. Specifically, each individual measurement device that utilizes the model, or a function or coefficient derived therefrom, is able to provide a measurement that is consistent with the measurements made by the control batch instruments.

In the field of measurement calibration and inter-instrument agreement, present approaches are unable to compensate for divergent inter-instrument agreement. In part, this is because each member of the later batch may provide a color measurement that is within a quality control threshold of a given reference measurement, but such a measurement might diverge from the control batch measurements. However, simply adjusting the measurements of each individual unit does not, in fact, correct the inter-instrument agreement problem.

Thus, the presently described systems and methods utilize a non-routine, unconventional approach to solving the problem of ensuring that devices manufactured under different production conditions are able to produce consistent measurements across batches. Furthermore, the described systems and methods are directed to using a sample device of a production batch to train an ANN to generate coefficients that can be used to ensure that the measurements of other members of the production batch have inter-instrument agreement with the values expected of a measurement device control batch.

Figure 1:
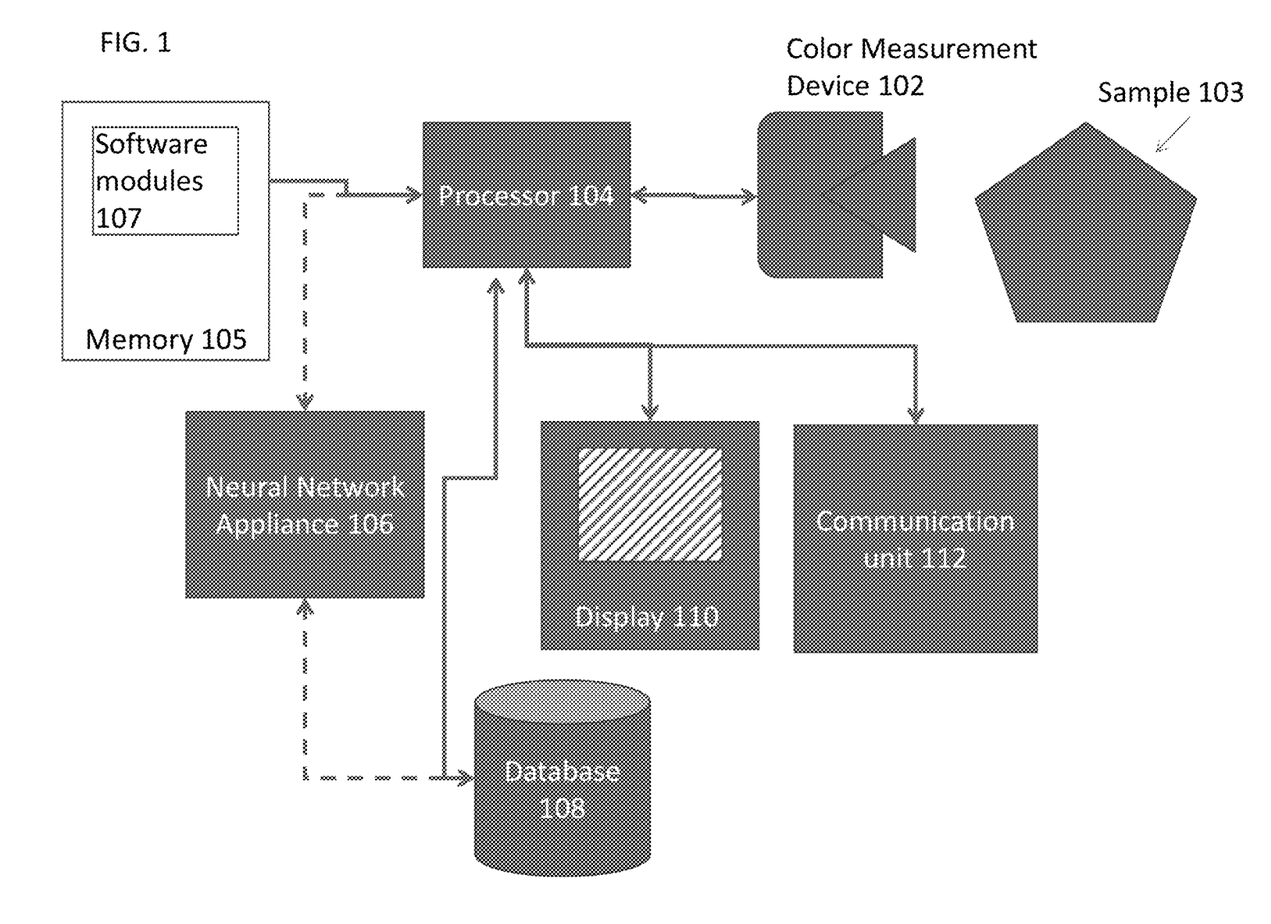
FIG. 1 illustrates the inter-instrument color measurement system according to one embodiment of the present invention.

Turning the illustrative example of the described system and methods, FIG. 1 details a color measurement device 102 is configured to obtain measurements of a sample 104. The measurements obtained by the color measurement device 102 are passed directly or indirectly to a computer or processor 104 for evaluation and/or further processing. The processor 104, configured by one or more modules stored in memory 105 is configured to pass measurements to an artificial neural network appliance 106. In an alternative configuration, the processor 104 is able to access from the database 108 one or more coefficients for application to the measurements obtained by the color measurement device 102 in order to provide updated or corrected color measurements to a database 108 or display 110. In one implementation the coefficients used to convert the measured color values to the output color values are stored as a dataset in the database 108.

With continued reference to FIG. 1, the sample 103 is a color swatch, fan deck, color sample, product, item or object. For example, the sample 103 is a collection of color samples having known color values. In another implementation, the sample 103 is any object where the CIE color values of the object is unknown or in need of clarification.

In one implementation the color measurement device 102 is a colorimeter. In a further implementation, the color measurement device 102 is a collection or array of photometers, light sensing elements, or other similar devices. In a further implementation, the color measurement device is one or more cameras or image acquisition devices such as CMOS (Complementary Metal Oxide Semiconductor), CCD (charged coupled device) or other color measurement devices. Such sensors can include data acquisition devices and associated hardware, firmware and software that is used to generate color values for a given sample. In a particular implementation, the color measurement device 102 is used to generate CIE color values or coordinates of a color sample 103. The color measurement device 102, in accordance with one embodiment, is a stand-alone device that is configured to one or more components, interfaces or connections to one more processors, networks, or storage devices. In such an arrangement, the color measurement device 102 is configured to communicate with the associated processors, networks, and storage devices using one or more USB, FIREWIRE, Wi-Fi, GSM, Ethernet, Bluetooth, and other wired or wireless communication technologies suitable for the transmission color, image, spectral, or other relevant data and or metadata. In an alternative arrangement, the color measurement device 102 is a component is a smartphone, tablet, cell phone, workstation, testing bench, or other computing apparatus.

In one or more implementations, the color measurement device 102 is configured to output one or more values when taking a measurement of a sample 103. For example, when a color measurement device 102 is a colorimeter, the output generated conforms for the CIE color standards. For instance, the color measurement device 102 is configured to output L*, a* and b* values according to the CIE standards. As used herein, the CIE color values refer to color coordinates defined by the Commission Internationale de l'Eclairage (CIE), where the L*a*b* color space is modeled after a color-opponent theory, and where L* indicates lightness, a* is the red/green coordinate, and b* is the yellow/blue coordinate.

In one or more implementations, the processor 104 is configured through one or more modules to receive CIE values generated by the color measurement device 102. However, in alternative configurations, the color measurement device 102 is configured to output raw or unformatted digital or analog signals. In this configuration, the processor 104 is configured to receive the raw or unformatted signals and construct CIE values therefrom.

With further reference to FIG. 1, the processor 104 is a computing device, such as a commercially available microprocessor, processing cluster, integrated circuit, computer on chip or other data processing device. In one or more configurations, the processor is one or more components of a cellphone, smartphone, notebook or desktop computer configured to directly, or through a communication linkage, receive color measurement data captured by the color measurement device 102. The processor 104 is configured with code executing therein to access various peripheral devices and network interfaces. For instance, the processor 104 is configured to communicate over the Internet with one or more remote servers, computers, peripherals or other hardware using standard or custom communication protocols and settings (e.g., TCP/IP, etc.).

In one configuration, the processor 104 is a portable computing device such as an Apple iPad/iPhone® or Android® device or other commercially available mobile electronic device executing a commercially available or custom operating system, e.g., MICROSOFT WINDOWS, APPLE OSX, UNIX or Linux based operating system implementations. In other embodiments, the processor 104 is, or includes, custom or non-standard hardware, firmware or software configurations. For instance, the processor 104 comprises one or more of a collection of micro-computing elements, computer-on-chip, home entertainment consoles, media players, set-top boxes, prototyping devices or "hobby" computing elements. The processor 104 can comprise a single processor, multiple discrete processors, a multi-core processor, or other type of processor(s) known to those of skill in the art, depending on the particular embodiment.

In one or more embodiments, the processor 104 is directly or indirectly connected to one or more memory storage devices (memories) to form a microcontroller structure. The memory is a persistent or non-persistent storage device (such as memory 105) that is operative to store the operating system in addition to one or more of software modules 107. In accordance with one or more embodiments, the memory comprises one or more volatile and non-volatile memories, such as Read Only Memory ("ROM"), Random Access Memory ("RAM"), Electrically Erasable Programmable Read-Only Memory ("EEPROM"), Phase Change Memory ("PCM"), Single In-line Memory ("SIMM"), Dual In-line Memory ("DIMM") or other memory types. Such memories can be fixed or removable, as is known to those of ordinary skill in the art, such as through the use of removable media cards or modules. In one or more embodiments, the memory of the processor 104 provides for the storage of application program and data files. One or more memories provide program code that the processor 104 reads and executes upon receipt of a start, or initiation signal. The computer memories may also comprise secondary computer memory, such as magnetic or optical disk drives or flash memory, that provide long term storage of data in a manner similar to the persistent memory device 105. In one or more embodiments, the memory 105 of the processor 104 provides for storage of application programs or modules 107 and data files when needed.

As shown, memory 105 and persistent storage 108 are examples of computer-readable tangible storage devices. A storage device is any piece of hardware that is capable of storing information, such as, data, program code in functional form, and/or other suitable information on a temporary basis and/or permanent basis. In one or more embodiments, memory 105 includes random access memory (RAM). RAM may be used to store data such as the venue data in accordance with the present invention. In general, memory can include any suitable volatile or non-volatile computer-readable storage device. Software and data are stored in persistent storage 108 for access and/or execution by processors 104 via one or more memories of memory 105.

In a particular embodiment, persistent storage 108 includes a magnetic hard disk drive. Alternatively, or in addition to a magnetic hard disk drive, persistent storage 108 can include a solid state hard drive, a semiconductor storage device, read-only memory (ROM), erasable programmable read-only memory (EPROM), flash memory, or any other computer-readable storage devices capable of storing program instructions or digital information.

The database 108 may be embodied as solid-state memory (e.g., ROM), hard disk drive systems, RAID, disk arrays, storage area networks ("SAN"), network attached storage ("NAS") and/or any other suitable system for storing computer data. In addition, the database 108 may comprise caches, including database caches and/or web caches. Programmatically, the database 108 may comprise flat-file data store, a relational database, an object-oriented database, a hybrid relational-object database, a key-value data store such as HADOOP or MONGODB, in addition to other systems for the structure and retrieval of data that are well known to those of skill in the art.

The media used by persistent storage 108 may also be removable. For example, a removable hard drive may be used for persistent storage 108. Other examples include optical and magnetic disks, thumb drives, and smart cards that are inserted into a drive for transfer onto another computer-readable storage medium that is also part of persistent storage 108.

Communications or network interface unit 112, in these examples, provides for communications with other subsystems or devices. In an embodiment, communications unit 112 may provide appropriate interfaces to the Internet or other suitable data communications network to connect to one or more servers, resources, API hosts, or computers. In these examples, communications unit 112 may include one or more network interface cards. Communications unit 112 may provide communications through the use of either or both physical and wireless communications links.

In one or more implementations, the display device 106 is a screen, monitor, display, LED, LCD or OLED panel, augmented or virtual reality interface or an electronic ink-based display device.

Those possessing an ordinary level of skill in the requisite art will appreciate that additional features, such as power supplies, power sources, power management circuitry, control interfaces, relays, interfaces, and/or other elements used to supply power and interconnect electronic components and control activations are appreciated and understood to be incorporated.

As described in more detail in the foregoing, the present systems and methods are directed to correction of instrument variation using at least one trained artificial neural network ("ANN"). In one implementation, the ANN is trained over a collection of measurements made using devices selected from a production batch and a control batch such that the trained ANN is able to provide values, models or coefficients to convert the production batch measurements into control batch measurements. Such a process is detailed with respect to FIG. 2A.

Figure 4:
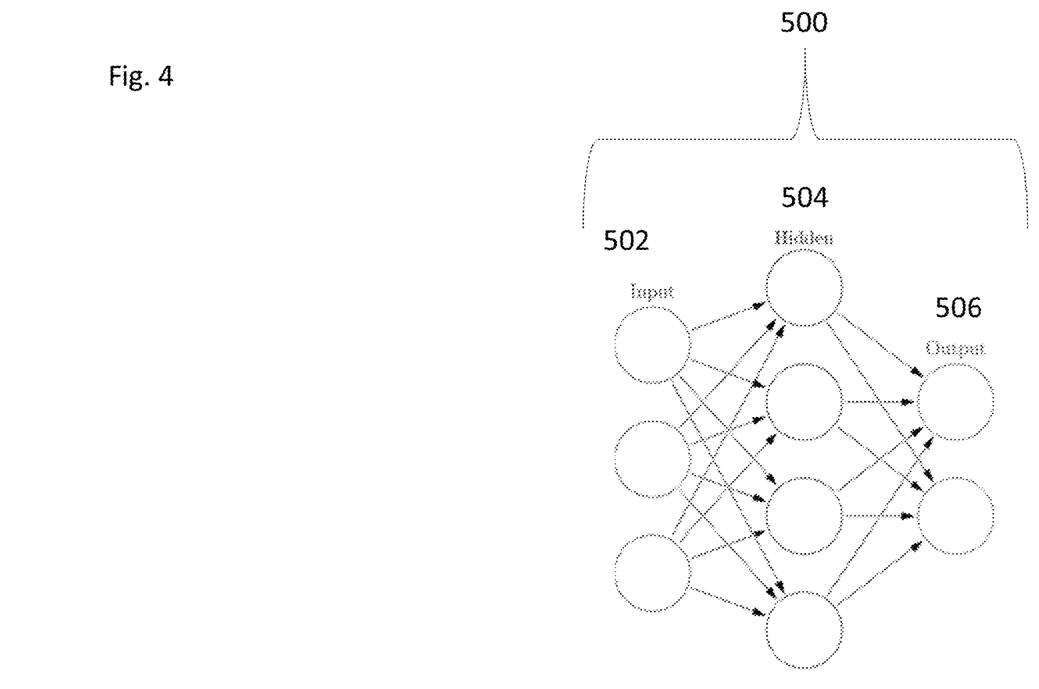
FIG. 4 presents a graph diagram detailing a representative node layer arrangement of an artificial neural network.

By way of overview, artificial neural networks ("ANNs") are well known in the prior art. The role of an ANN is to perform a non-parametric, nonlinear, multi-variate mapping from one set of variables to another. For example, ANN 500 of FIG. 4 illustrates such a mapping by operating on input vector(s) 502 to produce output vector(s) 506. To perform this mapping, a training algorithm is applied to deduce the input/output relationship(s) from example data. Such ANN training algorithms are also well known in the field.

With further reference to FIG. 4, the nodes of an ANN are organized into layers and are used to transform and weight input data from a source(s) (such as color measurement data generated by one or more color measurement devices) according to one or more algorithms. In a particular configuration, the neural network has three (3) or more layers. For example, a neural network implemented or accessed by the processor 104 has three (3) layers: an input layer, a hidden layer, and an output layer. In configurations where there are more than three (3) layers, it is typical to have two (2) or more hidden layers.

The source data provided to the input layer nodes are distributed to nodes located in the hidden layer. In one or more configurations, a single input node provides an output value to one or more hidden layer nodes. Thus, in one embodiment, each hidden layer node is configured to accept multiple input signals. The nodes of the hidden layer combine input signals directed to a specific hidden layer node and compare the combined (and weighted) values to an activation function in order to determine an output signal. The output signal generated by each node in the one or more hidden layers is distributed to one of more nodes in the next layer of the network. Upon reaching the output layer, the output nodes are configured to accept multiple inputs and, through the use of an activation function, generate an output signal or value.

If the signal propagates from one node to another, then that path can be defined and assigned initial weight values to transform the input into the output. However, for an ANN to provide useful output values based on input values, the entire ANN is trained so that for a given set of inputs, an anticipated set of outputs is provided. Training an ANN includes adjusting the weights provided for the paths connecting individual nodes.

For example, prior to training, an ANN is initialized by randomly assigning values to free parameters known as weights. The training algorithm takes an unorganized ANN and a set of training input and output vectors and, through an iterative process, adjusts the values of the weights. Ideally, by the end of the training process, presentation of a vector of inputs from the training data to the ANN results in activations (outputs) at the output layer that exactly match the proper training data outputs.

Figure 5:
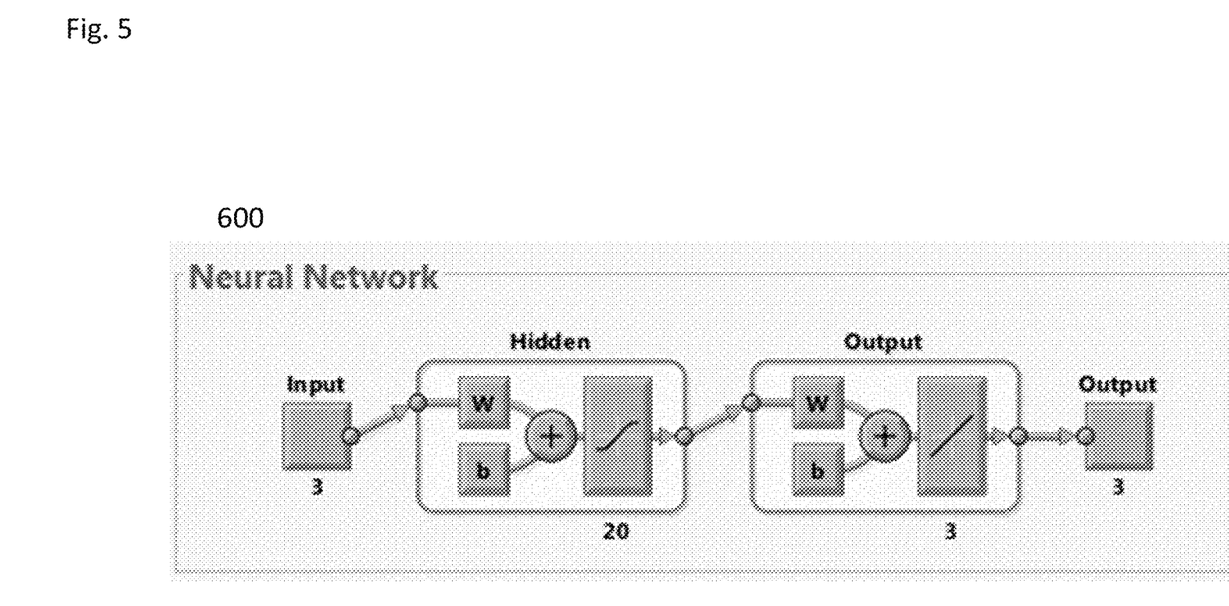
FIG. 5 presents a graph diagram detailing a representative node layer arrangement of an artificial neural network.

With more particular detail in FIG. 5, the basic unit that makes up an artificial neural network is variously known as an artificial neuron, neurode, or simply a node. Each ANN node has a number of variable inputs, a constant weight(s) (also known as a bias or a bias input), and an output. In one particular implementation, the variable inputs correspond to outputs of previous nodes in the ANN. Each input to a node, including the bias, is multiplied by a weight associated with that particular input of that particular node.

An example ANN is illustrated in FIG. 5 and consists of an input layer communicatively connected to one or more hidden layers. Hidden layers can be connected to one another, to input layer and to output layer. All layers are comprised of one or more nodes. Thus, data or other information flows from left to right, from each layer to the next adjacent layer.

When a network is generated or initialized, the weights are randomly set to values near zero. At the start of the ANN training process, as would be expected, the untrained ANN does not perform the desired mapping very well. A training algorithm incorporating some optimization technique must be applied to change the weights to provide an accurate mapping. The training is done in an iterative manner as prescribed by the training algorithm. The optimization techniques fall into one of two categories: stochastic or deterministic.

Training data selection is generally a nontrivial task. An ANN is only as representative of the functional mapping as the data used to train it. Any features or characteristics of the mapping not included (or hinted at) within the training data will not be represented in the ANN. Selection of a good representative sample requires analysis of historical data.

A training algorithm, or the neural network architecture itself, is stored in the neural network appliance 106 for access by the processor 104. The processor 104 is configured by the program code 107, to evaluate the color values data obtained from the color measurement device 102. In one or more alternative configurations the software modules 107 contain suitable instructions for implementing the training algorithm or the neural network architecture. For example, the neural network is a software application stored in a memory location locally accessible by the processor 104. Alternatively, FIG. 1 provides (in dashed lines) the neural network as stored on a remote appliance 106 accessible by the processor 104. In one or more configurations, the neural network is stored or hosted in a remote accessible storage device (e.g. cloud storage and hosting implementation) that allows for dynamically allocated additional processors, hardware or other resources on an "as-needed" or elastic need basis.

In one or more implementations, the present methods include training the ANN to generate the coefficient and/or function for application to the CIE color obtained by the measurement device of the production batch so as to match the anticipated output of one or more devices in the control batch.

As noted, in one implementation, the control group of measurement devices refers to a first production batch of devices generated using identical components. It will be appreciated that this first product batch is also evaluated against one or more calibration tests to ensure that the devices are producing the desired measurement results. So long as an individual unit within this first production batch provides output values within a pre-determined threshold of a known measurement value, the individual unit is included within the control batch. In a further implementation, the color values of a collection of reference tiles are measured by each unit in the first production batch and recorded. In one implementation, each unit is used to measure 12 BCRA tiles. For each batch (such as the first production batch), the mean color values of each of the 12 BCRA tiles are calculated by averaging the values of each tile from all units in the given batch. The 12 averaged color values are then assigned as the virtual color center of the given batch. Each of the measurements made by each unit in the given batch are compared to this virtual color center to determine the color difference of each unit in the given batch to the virtual center of the batch. In a further implementation, a selection of units is made based on the amount of difference between any given unit measurement and the virtual center measurements. For example, the selection of the member of the batch unit include selection the 10 units that have the closest color difference to the virtual center. These selected units are the units that are used for ANN training.

Figure 2A:
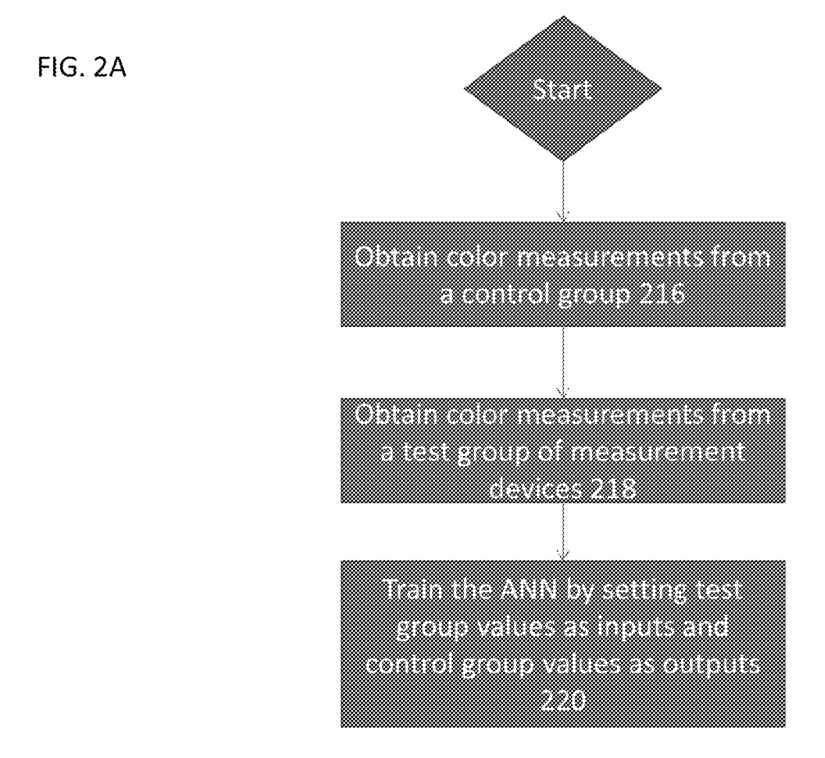
FIG. 2A illustrates a flow diagram of an inter-instrument variation correction system utilizing a neural network according to one embodiment of the present invention.
Figure 3:
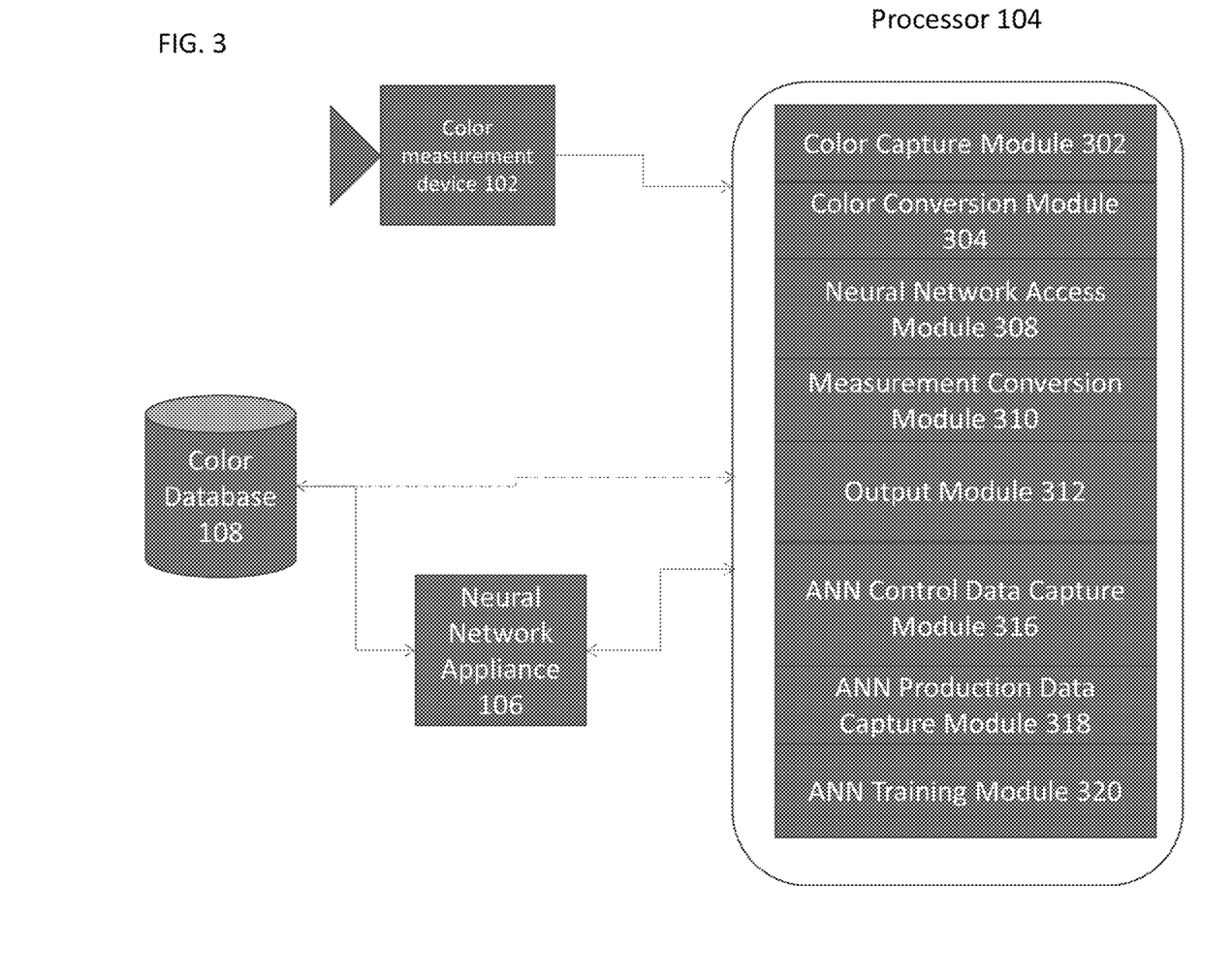
FIG. 3 presents a block diagram detailing the modules used to implement one embodiment of the present invention.

As further shown in step 216, one or more of the measurement devices within the control group are used to obtain a measurement of a known color sample. In one non-limiting implementation, one or more processors of one or more color measurement devices (such as color measurement device 102) are configured by an ANN control data capture module 316. In one implementation, an NCS color fan deck with 1950 colors is measured by at least two (2) different measurement devices (e.g. 102) that form a control group as in step 216. In a further implementation, each of the units in the control batch (i.e. 10 units) are used to measure the color reference standards. It should be appreciated that each measurement device is of the same make and model such that all of the devices in the control group include substantially identical in components. In a further implementation, the NCS color fan deck is measured using five (5) different color measurement units (102) selected from the control batch.

Continuing with the FIGS. 2A and 3, the ANN control data capture module 316 configures the processor 104 to access the CIE color values (e.g. L*a*b* result) generated by the one or more measurement devices in the control batch upon measurement of each of the colors in the NCS color fan deck as in step 216. In turn, the color values measured by each of the color measurement devices are averaged through one or more of the submodules of the ANN control data capture module 316 for each of the 1950 NCS colors in the color deck. The combined average L*a*b* values generated by each of the measurement devices within the control batch are stored in one or more databases, such as database 108, as a control database or data set by a processor 104.

Turning to step 218, a second group of color measurement devices, herein referred to as the production batch (such as later produced color measurement devices 102), are used to measure the same color deck as the control batch. In one implementation, the second group of color measurement devices are of a substantially similar make and model as the color measurement devices of the control batch. However, the members of the production batch have been manufactured at a different time, with different components or a different location. In a particular implementation, the individual color measurement devices selected to be in the production batch is based on a quality control process. For example, one or more of the color measurement devices of the production batch are used to measure a reference or calibration standard to ensure that the device is functioning within acceptable tolerances. Devices that provide an acceptable level of tolerance are incorporated into the production batch. In one particular implementation, there is at least two (2) measurement devices in the production group. In a further implementation, there are at least five (5) measurement devices in the production group.

In a particular implementation, shown within respect to step 218, one unit of the production batch is used to measure each of the 1950 NCS colors in the fan deck and generate corresponding CIE color values (e.g. L*a*b* results). In this configuration, the production batch only include one unit. However, in a particular implementation, selected members of the production batch are used to measure the colors in the fan deck and the measurements of the production batch measurements are averaged. In one or more implementations, one or more submodules of the ANN production data capture module 318 configures one or more processors to obtain measurement values (L*a*b* values) for each color of the fan deck or color refences. In one or more further implementations, each of the measurement values for the evaluated fan deck obtained by each measurement devices (e.g. one or more color measurement devices) within the production batch are stored in one or more databases. For instance, one or more submodules of the ANN production data capture module 318 configures a processor (e.g. processor 104) to store the production batch measurement data in a test database 108 or dataset.

Turning to step 220, an ANN is trained using the data obtained from both the control batch and the one or more units of the production batch. For example, a processor (such as but not limited to processor 104) is configured by the ANN training module 320 to instantiate or generate an ANN having input nodes, hidden layers and output nodes. For example, with reference to FIG. 5, one or more submodules of the ANN training module 320 module configures a processor to generate an ANN 600 with 3 input nodes, 20 hidden layer nodes and 3 output nodes. In one or more further implementations, one or more submodules of the ANN training module 320 configures a processor to generate default W and b parameter values that will be adjusted during training.

Continuing with the example provided in FIGS. 2A, 3 and 5, a processor is configured by the ANN training module 320, or a submodule thereof, to train the ANN by setting the L*a*b* values obtained from the production batch devices as the inputs to the ANN. In one particular implementation, the input values are the average of the ANN measurements for each color of the evaluation NCS color fan deck. For example, a processor is configured to access from the database 108 one or more data values, objects or files representing the data to be input to the ANN 600.

As shown in FIG. 5, the ANN is configured to produce output values in response to the input values. However, it is possible to pre-determine the output of the ANN 600 such that the output values are assigned to the L*a*b* results stored in the control database 108.

By way of particular detail, the ANN training module 320 is configured to set the input values of the ANN to the average L*a*b* values of each NCS color (such that the total input size will be 3×1950), or the L*a*b* values of each unit stacked together (so the total input size will be 3×9750 where five (5) measurement devices are used) obtained by one or more of the production batch color measurement units. Likewise, the stored color values obtained by one or more of the control batch units (such that the values are the three CIE values×1950 or the same one set of the control database stacked 5 times (size 3×9750) is be used).

According to ANN training step 220, the processor is configured by the ANN training module 320 to train the ANN. In one particular implementation, the processor is configured by the ANN training module 320 to train the ANN using one or more forward or back propagation algorithms. For example, the ANN is trained by a processor configured by the ANN training module 320 to determine the appropriate parameter values and weightings so that the input values (obtained from the production batch units) are transformed into the outputs (obtained from the control batch units).

As used herein, the back-propagation algorithms are based on a gradient descent training process. In one or more common approaches in the art, the ANN utilizes both forward propagation and back propagation components. In the forward propagation, the input information from the input layer is transmitted via the hidden layer for processing and ultimately transmitted to the output layer. The state of the neurons in each node layer only affects the next layer of neurons. Thus, when the output values that result from the ANN training using forward propagation are not in line with the desired values (such that when implemented the output fails to match the control values) then back propagation is used to calculate the difference between the desired output (i.e. the measurement values obtained from the control batch units) and the actual output based on the input (i.e., the output obtained running the measurement values obtained from the production batch units through the nodes recursively, layer by layer.

Once the ANN is trained as in step 220, the ANN 600 can be used or accessed to make live or real time corrections of measurements made by any color measurement device of the given production batch. By way of non-limiting implementation, the ANN, or coefficients or models derived therefrom, are made available to a processor in operative communication with color measurement device 102.

Figure 2B:
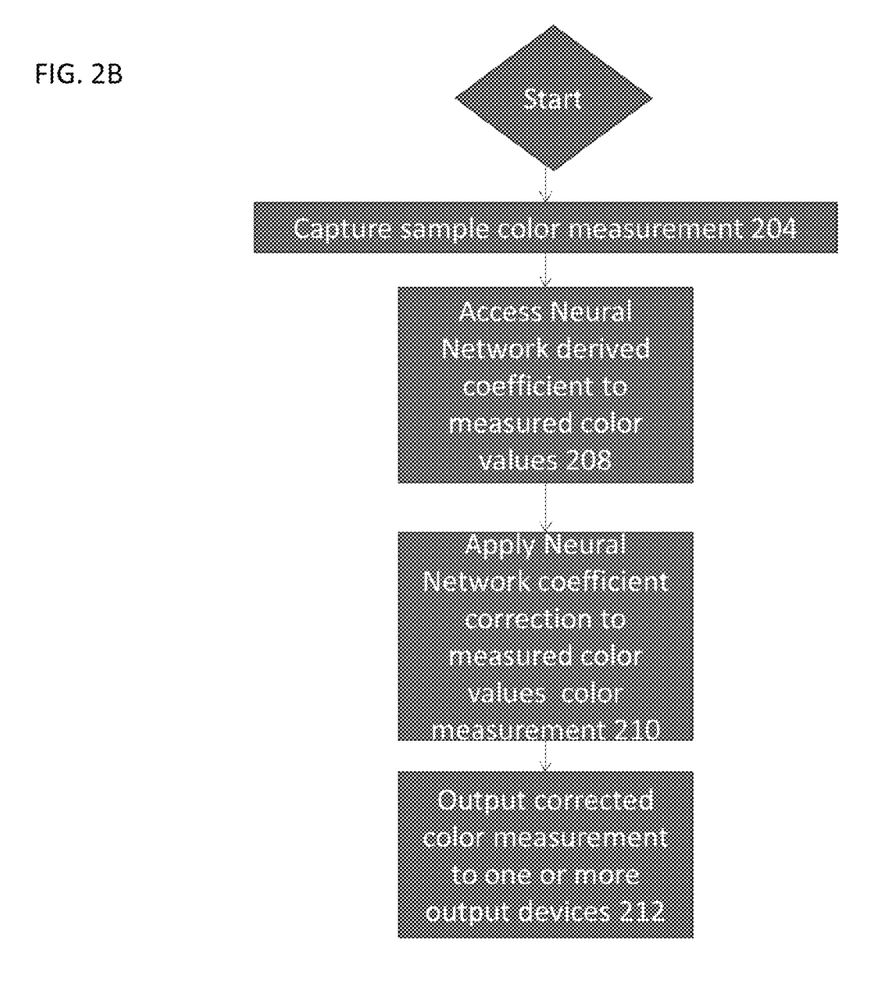
FIG. 2B illustrates a flow diagram of particular elements of the inter-instrument variation correction system training a neural network according to one embodiment of the present invention.

As shown with reference to FIGS. 2B and 3, in one particular implementation, any device or unit that could be included in the production batch can use the ANN or coefficients or models derived therefrom, to correct for measurement variance relative to the control group. For example, a processor 104 coupled or communicatively linked to a color measurement device that could be included in the production batch is configured by code stored in the memory 105. As shown in step 204, the processor is configured to capture a color measurement of a sample 103. Such code includes one or more software modules that configure the processor 104 to instruct the color measurement device 102 to capture color measurements of a sample 103. In one or more further implementations, the processor 104 is configured to instruct the color measurement device 102 to obtain CIE color values of sample 103. For instance, in step 204, the processor 104 is configured by a color capture module 302 initiates a capture routine or process to be carried out by the color measurement device 102.

In one non-limiting implementation, the color capture module 302 causes one or more color sensing elements of the color measurement device 102 to activate or record data corresponding to the sample 103 under analysis. In a further implementation, the color capture module 302 sends a capture instruction or flag to one or more processors of the color measurement device causing initiation of a color measurement process.

Turning to step 208, the ANN access module 308 configures the processor 104 to access the trained ANN or a model or coefficients derived therefrom. In a particular configuration, the ANN access module 308 configures the processor 104 to access one or more pre-generated or stored analytic models or coefficients generated using the ANN training process (such, but not limited to the training process outlined in steps 216 to 220) for a given production batch.

As shown in FIG. 2B, where the ANN training process results in generating one or more coefficients or functions to be applied to each of the CIE color values, the ANN access module 308 is configured to access such coefficients or functions. In one implementation, the coefficient or function accessed by a processor 104 are accessed from a database 108 or other remote storage location.

Using the accessed ANN derived coefficient or function, the processor 104 is configured by a measurement conversion module 310 to convert the measured values obtained by a given color measurement device 102 of the production batch, (as in step 204), using the ANN derived coefficient or function. Step 210 details converting the initial measurement into a corrected measurement. Specifically, where the training dataset for a given ANN is big enough and representative, the ANN derived coefficients and functions enable measurement values of an instrument having the characteristics of the production batch to be compensated or corrected so that the measurement values output by the corrected measurement device have a low degree of inter-instrument variability relative to the control batch. For instance, the measurement values output by the corrected measurement device are the equivalent of the output generated by a measurement instrument that is part of the control batch.

Upon generation of the converted measurement values, the converted measurement values are output to at least one display 110 or data storage device 108, or one or more remote computing devices for further processing. For example, in one implementation, the converted measurement values and the original measurement values are stored in a local or remote data storage location as shown in step 212. In one or more further implementations, the CIE output values are provided on a display 110 or transmitted to a remote device using communication interface 112.

Figure 2C:
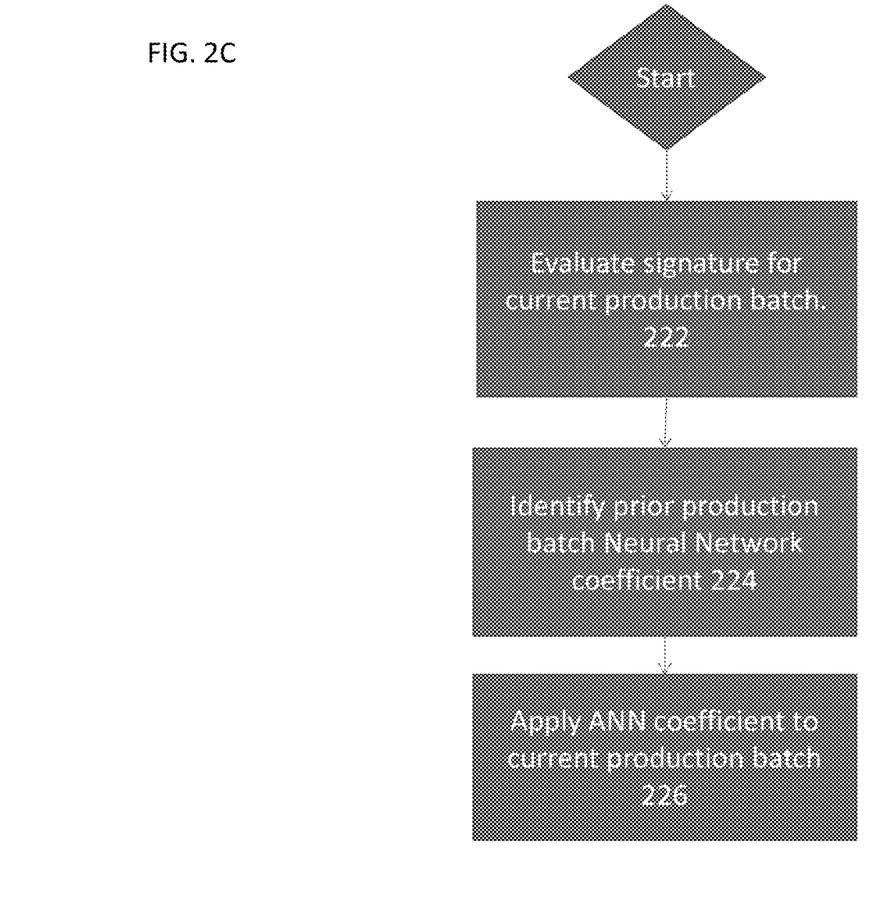
FIG. 2C illustrates a flow diagram of further particular elements of the inter-instrument variation correction system training a neural network according to one embodiment of the present invention.

As shown in FIG. 2C, where a new production batch has overlapping similarity to a prior production batch that has been used to train an ANN, a previously used ANN can be used to correct this new production batch without the necessity of training a new batch specific ANN.

In one particular implementation, each unit produced in a new, current production batch undergoes a quality control processes to check the performance of the device. For example, each color measurement device produced in a current production batch is used to evaluate a collection of reference colors. In one implementation, the reference colors are ceramic tiles. Upon measurement of the reference colors, the output is compared against known values for the reference colors. The amount of difference between the measured values and the known values is a determination of if the unit has been manufactured correctly. Since every unit they will have its output evaluated against this reference standard, the average measurement values for the entire batch can be calculated. The relative relationship between the currently produced batch average measurement values and the average measurement values for the control group can be treated as a measurement signature for that particular production batch. These production batch measurement signatures are then stored in one or more databases for further use.

When a new production batch of color measurement devices is generated, each unit within the batch is evaluated for quality control purposes. The result of such quality control evaluation is the average batch signature for that particular production batch. As shown with respect to step 222, an average batch signature for a new production batch is evaluated against the stored production batch signatures that were used to train ANNs. In a further implementation, one or more production parameters are also searched relative to a batch. Here, production parameters may include type and manufacturer of components, software, hardware modules, production location, and date of production. It will be appreciated that during the ANN training steps 216-220, at least one production parameter of the production batch is stored along with the ANN and any coefficients thereof in database 108. Thus, as in step 224, the database 108 of ANN and related coefficients are queried using the current production batch signature. In a further implementation, both the production batch signature and one or more production parameters are used to query the database of stored ANN models and associated coefficients.

As shown in step 226, where degree of similarity between the current production batch signature and a stored prior production batch signature is within a pre-determined threshold value, the identified prior production ANN coefficient or model can be applied to each member of the current production batch as in steps 210-212 in order to correct future measurements.

As detailed herein, the generation of an ANN or coefficients thereof, and its application to color measurement devices result in increased inter-batch agreement with the control batch. Thus, for all future batches, the measurement result of any unit in the future production batch can be conditions such that the result have a high degree of inter-instrument agreement with the average response expected of the devices in the control batch. Thus, the described approach provides a novel and non-routine application of ANN to the technical problem of inter-instrument variation. The described approach configures a color measurement unit belonging to a production batch, through one or more ANN modules, to generate an output value substantially similar to a device of a control batch, or the average value expected across the devices of the control batch, when measuring the same color. Such an approach represents an improvement in the reliability and accuracy of measurement devices. For example, through the described approach, the difficulty in correcting for inter-instrument variability is diminished by eliminating the need to determine the underlying cause or mechanism for the difference between instruments that are built using the same type of components but different makes and models. Since the ANN is a nonlinear system, the described approach can compensate unknown and complex system differences that are not apparent between ostensibly identical makes and model instruments. As a result, such a specific approach in the color measurement field achieves inter-instrument agreement without foreclosing or preempting other approaches to achieve inter-instrument agreement. While this specification contains many specific embodiment details, these should not be construed as limitations on the scope of any embodiment or of what can be claimed, but rather as descriptions of features that can be specific to particular embodiments of particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain embodiments, multitasking and parallel processing can be advantageous.

Publications and references to known registered marks representing various systems are cited throughout this application, the disclosures of which are incorporated herein by reference. Citation of any above publications or documents is not intended as an admission that any of the foregoing is pertinent prior art, nor does it constitute any admission as to the contents or date of these publications or documents. All references cited herein are incorporated by reference to the same extent as if each individual publication and references were specifically and individually indicated to be incorporated by reference.

While the invention has been particularly shown and described with reference to a preferred embodiment thereof, it will be understood by those skilled in the art that various changes in form and details may be made therein without departing from the spirit and scope of the invention. As such, the invention is not defined by the discussion that appears above, but rather is defined by the points that follow, the respective features recited in those points, and by equivalents of such features.

What is claimed is:

1. A method for correcting inter-instrumentation variation among color measurement devices comprising:
    a. obtaining at least one measurement of a sample target using a sample color measurement device selected from a first collection of color measurement devices;
    b. accessing with at least one processor configured by code, a conversion model, wherein the conversion module is generated using one or more artificial neural network(s) (ANN) trained over a collection of input values obtained from one or more members of the first collection and control output values obtained from members of a second collection of color measurement devices;
    c. processing with at least one processor the at least one measurement of the sample target using the conversion model;
    d. obtaining with at least one processor at least one calibrated measurement from the at least one measurement of the sample target processed using the conversion model;
    e. storing with at least one processor the calibrated color measurement values in a data storage device.

2. The method of claim 1, where the color values are expressed in CIE color coordinate values.

3. The method of claim 1, where the first collection of color measurement devices are selected from one of colorimeters, photometers or image acquisition devices.

4. The method of claim 3, where the second collection of color measurement devices are selected from one of colorimeters, photometers or image acquisition devices.

5. The method of claim 1 wherein the ANN model is trained using at least one back-propagation algorithm.

6. The method of claim 5 wherein the ANN model is generated using a second device type dataset as the output nodes and a first device type dataset as the input nodes.

7. The method of claim 6, where the control data set is generated by obtaining the measurements of a plurality of known color standards by the second collection of color measurement devices, where each of the color measurement devices in the second collection of color measurement devices is constructed using substantially similar components, such that each of color measurement devices in the second collection generates output measurements within a pre-determined threshold value of a mean of measurement values taken of the one or more calibration standards.

8. The method of claim 6, where the plurality of color measurement devices in the second collection is greater than or equal to 10.

9. The method of claim 6, where the target data set is generated by obtaining the measurements of a plurality of known color standards by one or more members of the first collection of color measurement devices, where each of the color measurement devices of the first collection is constructed using substantially identical components, such that each of color measurement devices in the first collection generates output measurements within a pre-determined threshold value of a mean of measurement values taken of one or more calibration standards.

10. The method of claim 9, where the number of color measurement devices in the first collection is greater than or equal to 10.

11. The method of claim 10, where a color sensing component of each of the second collection of color measurement devices is different from a color sensing component of sample color measurement device.

12. A method for correcting inter-instrument variation comprising:
  f. obtaining a collection of color measurements of at least one quality control calibration standard using a plurality of color measurement devices in a first collection, where each of the color measurement devices are of a first type;
  g. generating a mean value for the measurements of the first collection of color measurement devices;
  h. determining a sub-set of the first collection of color measurement devices having the smallest color difference from the generated mean value;
  i. obtaining a first collection of measurements of a training color set using each color measurement device of the determined sub-set;
  j. obtaining a collection of color measurements of the at least one quality control calibration standard using a plurality of color measurement devices in a second collection, where each of the color measurement devices are of a second type;
  k. generating a mean value for the measurements of the second collection of color measurement devices;
  l. determining a sub-set of the second collection of color measurement devices having the smallest color difference from the generated mean value;
  m. obtaining a second collection of measurements of a training color set using each color measurement device of the determined sub-set;
  n. applying the first collection of measurements as input values to an artificial neural network (ANN), and setting the output as the second collection of measurements obtained from the second collection of measurement devices;
  o. generating a conversion coefficient using the ANN;
  p. applying the generated conversion coefficient to at least one measurement made by any one of the remaining members of the first collection.

13. The method of claim 12, wherein the plurality of first color measurement devices in the first collection are each made with substantially identical components.

14. The method of claim 12, wherein the plurality of second color measurement devices in the first collection are each made with substantially identical components.

15. The method of claim 12, wherein the sub-set of the first collection of color measurement devices has at least one production parameter different from the control collection of color measurement devices of the second type production device.

16. A system for correcting inter-instrument variation comprising:
  a. A color measurement device selected from a batch of color measurement devices of a first type and configured to measure the color values of a sample; and
  b. A processor, having a memory, and configured to:
    i. receive from the color measurement device, one or more data values corresponding to the measured color values of a sample;
    ii. access, from a memory, at least one evaluating model, wherein the evaluation model receives color values as an input and the evaluation model was generated using one or more artificial neural network(s) (ANN) trained to convert measurements made of the first type of color measurement device into measurements of the same sample made by a second type of color measurement device;
    iii. evaluate the received data values using the evaluation model;
    iv. obtain evaluated measurement values; and
    v. transmit the evaluated measurement values to at least one of: a remote computer, display device or human perceptible indicator.

17. The system of claim 16 where the conversion module is generated using one or more artificial neural network(s).

18. The system of claim 16 where the artificial networks are trained using at least one back propagation algorithm.

19. The system of claim 16, where the first type of color measurement devices are selected from one of colorimeters, photometers or image acquisition devices.

20. The system of claim 16, where the second type of color measurement devices are selected from one of colorimeters, photometers or image acquisition devices.

* * * * *